(12) United States Patent
De Souza et al.

(10) Patent No.: US 11,095,165 B2
(45) Date of Patent: Aug. 17, 2021

(54) RF POWER HARVESTER

(71) Applicant: Drayson Technologies (Europe) Limited, London (GB)

(72) Inventors: Aline Coelho De Souza, London (GB); Bruno Roberto Franciscatto, London (GB); Vitor Andrade Freitas, London (GB)

(73) Assignee: Drayson Technologies (Europe) Limited, London (GB)

( * ) Notice: Subject to any disclaimer, the term of this patent is extended or adjusted under 35 U.S.C. 154(b) by 0 days.

(21) Appl. No.: 16/608,395

(22) PCT Filed: Mar. 29, 2018

(86) PCT No.: PCT/GB2018/050875
§ 371 (c)(1),
(2) Date: Oct. 25, 2019

(87) PCT Pub. No.: WO2018/197833
PCT Pub. Date: Nov. 1, 2018

(65) Prior Publication Data
US 2020/0195059 A1    Jun. 18, 2020

(30) Foreign Application Priority Data

Apr. 28, 2017 (GB) .................................... 1706873

(51) Int. Cl.
*H02J 50/27* (2016.01)
*H01Q 5/364* (2015.01)
(Continued)

(52) U.S. Cl.
CPC .............. *H02J 50/27* (2016.02); *H01Q 1/38* (2013.01); *H01Q 5/364* (2015.01); *H01Q 9/42* (2013.01); *H02J 50/001* (2020.01)

(58) Field of Classification Search
CPC ........ H02J 50/27; H02J 50/001; H01Q 5/364; H01Q 1/38; H01Q 9/42
See application file for complete search history.

(56) References Cited

U.S. PATENT DOCUMENTS 6,285,342 B1    9/2001    Brady
7,847,736 B2 *  12/2010   Channabasappa ....... H01Q 1/38
                                                       343/700 MS
(Continued)

FOREIGN PATENT DOCUMENTS

| GB | 2232027 A | 11/1990 |
| GB | 2517221 A | 2/2015 |
| JP | 2007073015 A | 3/2007 |

OTHER PUBLICATIONS

International Search Report and Written Opinion dated Jun. 14, 2018 for corresponding International Application No. PCT/GB2018/050875.

(Continued)

*Primary Examiner* — Carlos Amaya
(74) *Attorney, Agent, or Firm* — Tarolli, Sundheim, Covell & Tummino LLP

(57) ABSTRACT

An RF power harvester comprising a dielectric substrate, having a first major surface and a second major surface, opposite to the first major surface; a connection for a rectifier on the first major surface; an antenna carried on the substrate for harvesting electrical power from a radio frequency electromagnetic field. The antenna comprising a first track of conductive material, carried on the first major surface and comprising a first end adjacent an edge of the substrate, a second end for connection to the rectifier, a first series of line sections between the first end and the second end and a first plurality of meanders, wherein a first line section of the series provides the first end and each subsequent line section (Continued)

is connected to its preceding line section by a meander and is of greater length than its preceding line section.

13 Claims, 4 Drawing Sheets

(51) Int. Cl.
*H02J 50/00* (2016.01)
*H01Q 1/38* (2006.01)
*H01Q 9/42* (2006.01)

(56) References Cited

U.S. PATENT DOCUMENTS

| 2006/0097930 | A1 | 5/2006 | Rosenberg | |
|---|---|---|---|---|
| 2007/0023525 | A1 | 2/2007 | Son | |
| 2007/0178857 | A1* | 8/2007 | Greene | H02J 1/00 455/127.1 |
| 2008/0007478 | A1 | 1/2008 | Jung | |
| 2008/0204329 | A1 | 8/2008 | Taki | |
| 2009/0045961 | A1 | 2/2009 | Chamarti | |
| 2010/0109970 | A1 | 5/2010 | Ganwani | |
| 2014/0339308 | A1 | 11/2014 | Endou | |

OTHER PUBLICATIONS

GB Search and Examination Report dated Jul. 5, 2017 for corresponding GB Application No. 1706873.5.
GB Examination Report dated Jun. 25, 2017 for corresponding GB Application No. 1706873.5.
Mazzilli, F., Thoppay, P. E., Johl, N., & Dehollain, C. (2010). Design methodology and comparison of rectifiers for UHF-band RFIDs. 2010 IEEE Radio Frequency Integrated Circuits Symposium. doi:10.1109/rfic.2010.5477347.
EP Communication dated Sep. 28, 2020 for corresponding EP Application No. 18717655.7.

* cited by examiner

RF POWER HARVESTER

FIELD OF INVENTION

The present disclosure relates to methods and apparatus for harvesting energy from stray electromagnetic fields which may be emitted from electrical and electronic devices. The present disclosure also provides antennas designed to harvest power from such fields.

BACKGROUND

The ability to transfer electrical energy over an air gap, or in vacuum, by means of alternating electromagnetic fields is well known. Two distinct applications have been developed for this phenomenon: wireless power transfer on the one hand, and wireless power harvesting on the other. The former relies upon the deliberate transfer of power from a dedicated transmit coil to a dedicated receive coil. The latter relies upon stray electromagnetic fields, such as those generated by switching of electronic devices or by telecommunications transmitters, to harvest or scavenge power from their environment.

In the field of wireless power transfer systems to transfer electrical power using alternating electrical field (E-field) and/or alternating magnetic field (H-field). Some wireless power transfer systems operate using so-called near-field coupling. Although it is less common, others may use far-field coupling.

Typically, H-field power transfer, also known as inductive power transfer may be more effective in the near-field, whereas in the far-field E-field effects may be more useful.

Wireless battery chargers and near-field RF communications devices both use inductive coupling to transfer power via an alternating H-field. Wireless battery chargers are in widespread use. Such chargers may include coils which operate, in effect, as the primary coil of a transformer, and couple inductively with a similar coil carried by the device which is to be charged. In these kinds of systems the transmitting and receiving coils can be placed in very close proximity to each other. Other types of wireless power transfer systems may operate in a similar way.

For example, near-field RF communications devices such as RFID and NFC devices are also in widespread use and are perhaps the most common type of wireless power transfer devices. The operating frequency of near field RF communications is around 13.56 MHz. The corresponding wavelength is about 22 meters. Accordingly, a half-wave dipole antenna would need to be about 11 meters in length if it were to radiate well. Generally, due to the circumstances in which they are most often used, NFC antenna area may be limited to about 7 cm×2.5 cm. The maximum linear dimension is thus about 0.5% of a wavelength—a consequence of this is that the radiation efficiency of an NFC antenna is generally very, very low. Generally therefore, the object of NFC antenna design is to occupy as large a volume as possible. Generally simple coils with multiple turns are used, and the frequency response of such inductors needs only to be specified very loosely. It barely needs to be considered at all.

Telecommunications antenna design on the other hand is a complex technical field which involves a variety of considerations. Telecommunications devices such as cellular telephone handsets, Wi-Fi® access points and routers, telecommunications network nodes such as base stations may provide relatively high energy emissions. These emissions can be used to mediate data signals over relatively long distances, and typically rely on far-field, as opposed to near-field, effects.

For wireless devices in general, and cellular telecommunications devices in particular, there is a general desire to increase communications range and to reduce energy losses in the environment immediately surrounding a wireless device. For example, cellular telephone handsets may be arranged to direct electromagnetic energy away from the body of a human user. This may assist in transmitting greater signal energy over greater distances.

SUMMARY

The disclosure provides RF power harvesters adapted for use in miniaturised devices. Such RF power harvesters comprise an antenna for coupling with an RF electromagnetic field to provide an alternating electrical signal. The antenna is disposed on a dielectric substrate, which may be disc shaped.

In an aspect there is provided an RF power harvester comprising:
  a dielectric substrate, having a first major surface and a
     second major surface, opposite to the first major surface;
  a rectifier on the first major surface;
  an antenna carried on the substrate for harvesting electrical power from a radio frequency electromagnetic field, the antenna comprising:
  a first track of conductive material, carried on the first major surface and comprising a first end adjacent an edge of the substrate, a second end connected to a rectifier, a first series of line sections between the first end and the second end and a first plurality of meanders.

For example, a first line section of the series can comprise the first end, and each subsequent line section of the series can be connected to its preceding line section by a meander. Each subsequent line section may also be of greater length than the preceding line section of the series. The lengths of these line sections may be selected to provide a chosen resonance characteristic of the antenna. They may also be selected to increase the length of the antenna that can be provided on the surface of the substrate. The first end may be near a corner or curve at the edge of the substrate. Embodiments may provide an antenna which can match the form factor of a substrate of any chosen shape.

The rectifier may be provided on the substrate, e.g. on the first major surface, or on a separate substrate. In some embodiments the first major surface of the substrate carries a connection for a rectifier. This may comprise an impedance matching element, such as a suitable transmission line or network of reactive components. In some embodiments it simply comprises a connection terminal such as a via, which may pass through the substrate.

The antenna may further comprise a second track of conductive material carried on the second major surface and comprising a second series of line sections and a second plurality of meanders,
  wherein a first line section of the second series provides
     a first end of the second track and each subsequent line section of the second series is connected to its preceding line section by a meander and is of greater length than its preceding line section.

Each line section of the first series of line sections may overlie a corresponding line section of the second series of line sections. Each line section may be provided by a straight length of conductive track. Each meander may change the direction of the conductive track by 180°. For example it may comprise a 180° bend in the track.

The line sections of each series (e.g. of the first track and the second track) may be parallel to one another. The first meander of the first series and the first meander of the second series may be spaced apart in the direction of the line sections, and in a direction through the substrate. In such an arrangement, the second track may be flipped with respect to the first track—e.g. it may be reflected about a line of symmetry which bisects the line sections (e.g. bisects them at right angles).

For example, the first track may follows the same (e.g. an identical) path across the first major surface as the second track follows across the second major surface. As a result, because said surfaces are back-to-back, the second track may be a mirror image of the first track—e.g. reflected in a mirror line at the edge of the substrate.

The power harvester may comprise a layer of conductive material disposed on the second major surface of the substrate, wherein the layer provides a ground plane for the rectifier, and for the antenna.

The second end of the second track may be connected to the layer.

The rectifier may overlie the layer, and may be separated from the layer by the substrate.

The layer may be bounded by a straight edge which is parallel with the line sections.

The RF power harvester may be surrounded (e.g. around the edges of the substrate) by conductive walls, e.g. in the form of a casing such as a box or cylinder. The cross section of the casing may match the cross section of the substrate—for example in the case of a circular disc shaped substrate, the casing may be a cylinder. At least one of the end faces of the cavity may be covered by a non-conductive material, such as glass, or plastic. One of the end faces may be closed by a cap of conductive material, e.g. a metal.

The conductive walls are provided by a cavity in a body of conductive material. In some embodiments, the conductive walls may be used to provide a ground plane as an alternative to providing a layer on the substrate. The cavity may be a cylinder such as a circular cylinder. The substrate may be planar, e.g. flat, and may be disc shaped. The substrate may be arranged perpendicular to the walls of the cavity.

BRIEF DESCRIPTION OF DRAWINGS

Embodiments of the disclosure will now be described in detail with reference to the accompanying drawings, in which.

In the drawings like reference numerals are used to indicate like elements.

SPECIFIC DESCRIPTION

Figure 1:
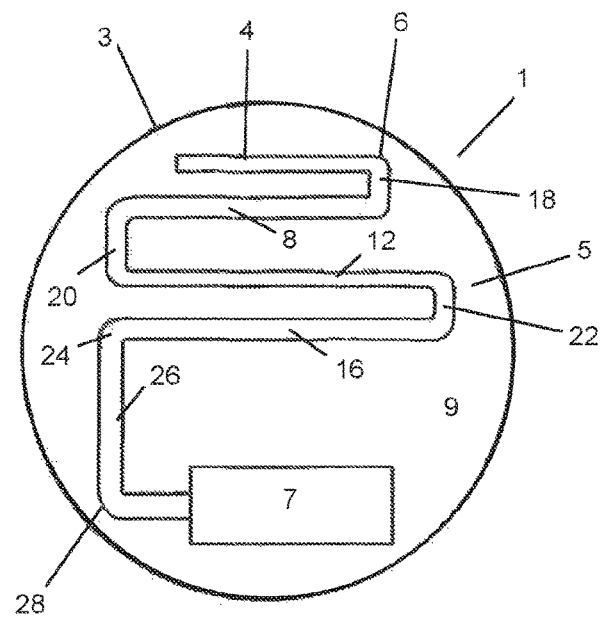
FIG. 1 shows a plan view of a front face of an RF power harvesting apparatus.

FIG. 1 shows a plan view of a front face of an RF power harvesting apparatus 1. The apparatus 1 comprises a dielectric substrate 3, which may be flat and thin, like a plate, for example it may be disc shaped.

The apparatus 1 also comprises a first track 6, arranged on the first major surface 9 of the substrate 3 to provide a monopole antenna 5. In addition, the apparatus 1 also comprises a rectifier 7, which may be disposed on the first major surface 9 of the substrate 3. The first track 6 which makes up the antenna 5 is connected to the rectifier 7.

The first track 6 includes a series of four straight line sections 4, 8, 12, 16 arranged in parallel with one another and spaced apart across the first major surface 9 of the substrate 3. The first of these line sections 4 is the shortest, and its first end is free (in the sense that it is the terminal end of the track, e.g. its tip, surrounded only by dielectric). The other end of the first line section 4 is connected to the adjacent (nearest) end of the second line section 8 of the series by a meander 18. The other end of that second line section 8 is connected to the adjacent end of the third line section 12 by another meander 20. Likewise, the other end of the third line section 12 is connected to the adjacent end of the fourth line section 16 by yet another meander 22.

At the other end of that fourth line section 16, there is a right-angle bend 24 in the track, away from the other line sections. And a length of track 26 extends from that bend across the surface 9 of the substrate 3 transverse to the series of line sections 4, 8, 12, 16. At the end of this length of track 26 (which may be the same length as the second line section 8 in the series), another right-angle bend 28 turns the track so it again runs parallel to the line sections 4, 8, 12, 16 to connect to the rectifier 7.

The meanders 18, 20, 22, extend across the surface 9 of the substrate 3 in the direction of the spacing between adjacent line sections. The meanders 18, 20, 22, 22 may be straight, or may comprise one or more curved sections of track arranged to provide two successive right angle bends in the same sense—e.g. either both are right handed, as for the first and third meanders 18, 22, or both are left handed as for the second meander 20.

Each meander thus provides a reversal, (e.g. a 180° bend) in the course followed by the first track 6 across the surface 9 of the substrate 3.

The series of line sections 4, 8, 12, 16 are of progressively increasing length, the second 8 being longer than the first 4, the third 12 longer than the second 8, and the fourth 16 longer than the third 12. The lengths of these line sections, and the spacing between them, may be selected to tune the antenna 5. In addition, in some embodiments, the provision of line sections of differing lengths increases the lengths of antenna which can be disposed on irregular, curved edged, or small areas of dielectric substrate, such as the disc shaped substrate illustrated in FIG. 1.

Although it is not illustrated in FIG. 1, a ground plane for the rectifier 7 and the antenna 5 may be provided by an adjacent conductive body. This may be provided by a layer of conductive material covering all or part of the second major surface (not shown in FIG. 1) of the substrate 9 and/or by electrically conductive walls of a cavity into which the apparatus can be installed. One such cavity is described with reference to FIG. 6. As another example, the apparatus illustrated in FIG. 1 may further comprise the features of the apparatus illustrated in FIG. 2 and FIG. 3.

Figure 2:
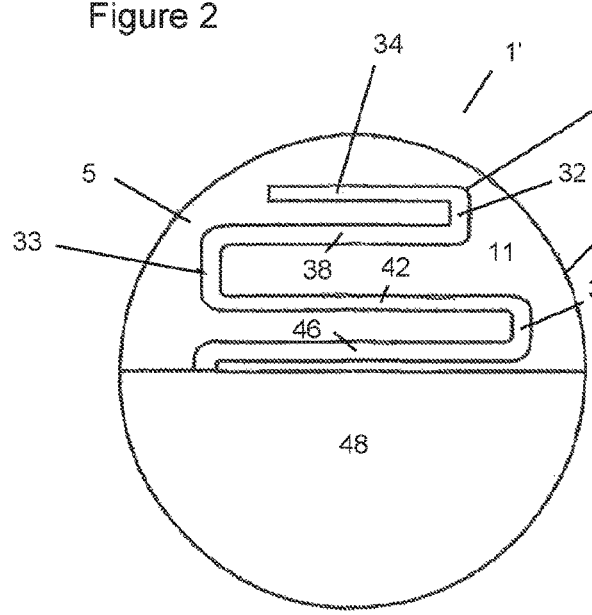
FIG. 2 shows a plan view of rear face of another RF power harvesting apparatus which carries, on its front face, the apparatus illustrated in FIG. 1.

FIG. 2 shows a view of an apparatus 1'. As with the apparatus illustrated in FIG. 1, this apparatus 1' comprises a substrate 3 having a first major surface 9 (which is not visible in FIG. 2) and a second major surface 11. The apparatus 1' also comprises a rectifier 7 (also not shown in FIG. 2) on this first major surface which is the same as illustrated in FIG. 1. FIG. 1 can be taken to show the first major surface, in plan, of the apparatus 1' the second major surface 11 of which is shown in FIG. 2.

In the apparatus 1' shown by FIG. 2, the antenna 5' comprises the first track 6 (illustrated in FIG. 1) of conductive material, carried on the first major surface 9 of the substrate 3 as described above. In addition it also comprises a second track 30 of conductive material carried on the second major surface 11 of the substrate 3.

As illustrated in FIG. 2, the second track 30 also comprises a series of line sections 34, 38, 42, 46 joined by a series of meanders 32, 33, 35. The series of line sections 34, 38, 42, 46 and meanders 32, 33, 35 of the second track 30 are arranged on the second major surface 11 in exactly the same way as the first track 5 is arranged on the first major surface 9. The end of the fourth line section 46 however is connected to a layer 48 of conductive material which covers a region of the second major surface 11 of the substrate 3. That region of the second major surface 11 corresponds to (e.g. at least matches, and perhaps encompasses) the area of the first major surface 9 which carries the rectifier 7. Thus, when viewed in plan, the rectifier 7 overlies this layer 48 of conductive material but is separated from it by the dielectric substrate 3.

Figure 3:
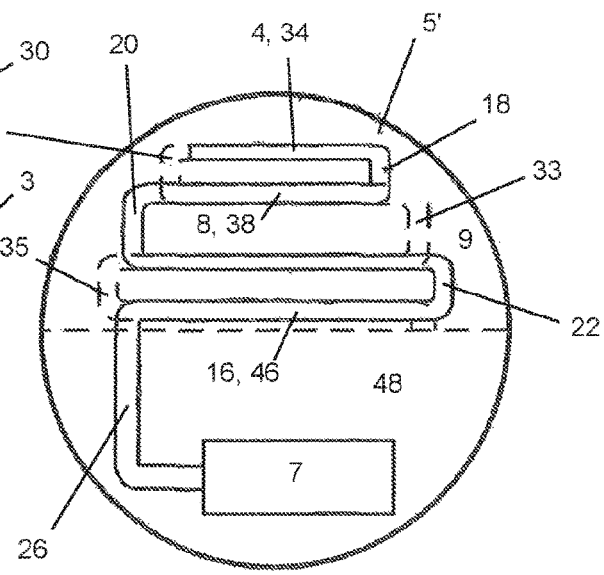
FIG. 3 shows a view of the RF power harvesting apparatus shown in FIG. 2 which is useful in understanding operation of the apparatus.

FIG. 3 is a plan view of the first major surface of the apparatus illustrated in FIG. 2. In FIG. 3, the position of the second conductive track 30 and layer 48 of conductive material (which are hidden in that view) are indicated in broken lines.

It can be seen in FIG. 3 that the first line section 4 of the first track 6 is aligned with the first line section 34 of the second track 30 (but separated from it by the substrate 3). Thus, the one line section 4 overlies the other 34. The first meander 18 in the first track 6 however is spaced apart from the first meander 32 in the second track 30 by the length of the first line sections 4, 34. Likewise, the second line section 8 of the first track 6 overlies the second line section 38 of the second track 30. The third line section 12 and fourth line section 16 respectively are also each aligned with the corresponding line section 42, 46 of the other track. Similarly, corresponding meanders 20, 33 of the two tracks are spaced apart by the lengths of the line sections 8, 38 which precede them.

It can thus be seen that, a degree of capacitive coupling (e.g. similar to that provided between a microstrip and ground plane) is provided between each respective pair of line sections in the two tracks 6, 30. There may also be inductive coupling between the two tracks 6, 30. The second track 30 thus provides a parasitic resonator that is electromagnetically coupled to the first track 6. This coupling between first track 6 and second track 30 provides a combined monopole antenna 5' which comprises both of the two tracks 6, 30.

In each of the two tracks 6, 30, each line section provides a degree of inductance, and the meanders may provide a degree of ohmic (resistive, low-resistance) conduction between adjacent line sections. This may increase the effective capacitance and inductance of the antenna leading to increase the effective length of the current path and therefore decreasing the resonance frequency of the antenna. The layer 48 of conductive material acts as a ground plane both for the antenna 5' and for the rectifier 7.

Figure 4:
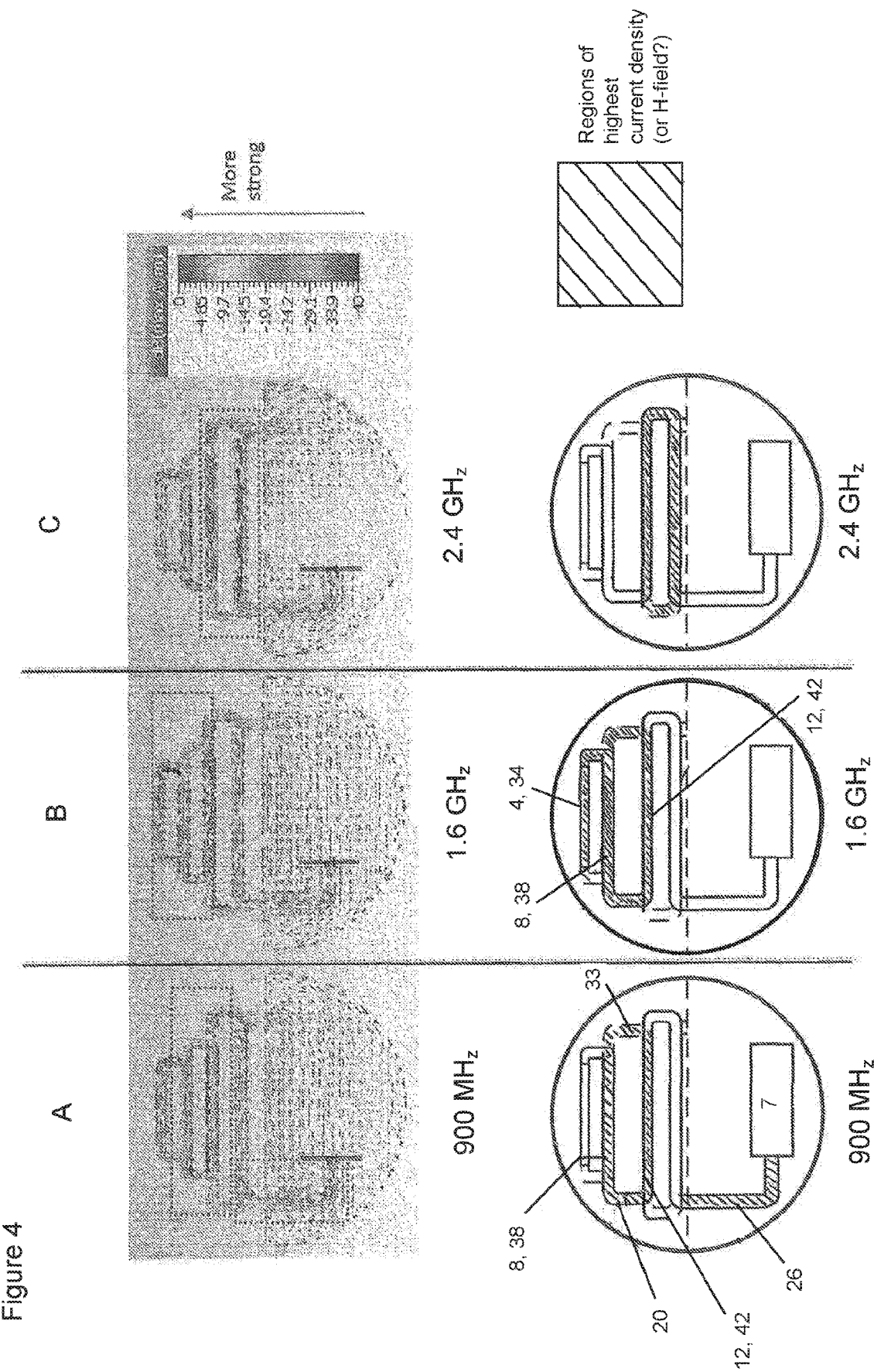
FIG. 4 is a schematic illustration of three different current distributions which may be provided, at each of three different resonant frequencies, by the antenna structure illustrated in FIG. 2 and FIG. 3

FIG. 4 is a schematic illustration of three different surface current distributions which may be provided, at each of three different resonant frequencies, by the antenna structure illustrated in FIG. 2 and FIG. 3.

FIG. 4 includes 3 insets.

Inset A is an illustration of the expected surface current distribution at an excitation frequency of 900 MHz; Inset B—an illustration of the expected current densities at an excitation frequency of 1.6 GHz; and Inset C—an illustration of the expected current densities at an excitation frequency of 2.4 GHz. Each inset includes tow diagrams. The upper diagram in each inset is a colour vector plot indicating the regions of the antenna 5 which contribute most strongly to the resonance of the antenna at the relevant frequency. Beneath each of these colour vector plots is a black-and-white diagram of the apparatus in which these regions are indicated by cross-hatching.

As shown in Inset A the second 8, 38 and third 12, 42 line sections of the two tracks, and the meanders 20, 33 are configured to provide, in effect, a single loop RF conduction path. The dimensions of this path are selected so that the antenna 5 resonates in response to an excitation signal of 900 MHz. The length of track 26 which joins the fourth line section to the rectifier 7 may also be of a length selected to contribute to the resonance of the antenna 5 at this frequency.

As shown in Inset B the first 4, 34, second 8, 38, and third 12, 42 line sections of the two tracks 6, 30, and the meanders 18, 20, 32, 33 which join them provide, in effect, a double loop (figure-of-eight) RF conduction path. The dimensions of this path are selected so that the antenna 5 resonates in response to an excitation signal of 1.6 GHz. As shown in Inset C the third and fourth line sections of the two tracks together provide a structure which resonates in response to an excitation signal of 2.4 GHz.

For the purposes of the conduction of RF electrical current therefore, the two tracks 6, 30 operate together to provide a monopole antenna 5 with three distinct resonances. The example shown in FIG. 4 relates to a structure in which the resonance characteristics of the apparatus have been chosen so that the antenna is tuned to three particular frequencies, but it will be appreciated in the context of the present disclosure that the resonance characteristics of the antenna is (e.g. its resonant frequencies) are determined by the length of these line sections, the spacing between adjacent line sections on each surface of the substrate, the thickness of the substrate, and the dielectric constant of the substrate. It will similarly be appreciated that these parameters determine the inductive and capacitive impedances of the RF conduction loops illustrated in FIG. 4, and that by appropriate selection of these parameters, different resonances can be provided.

Figure 5:
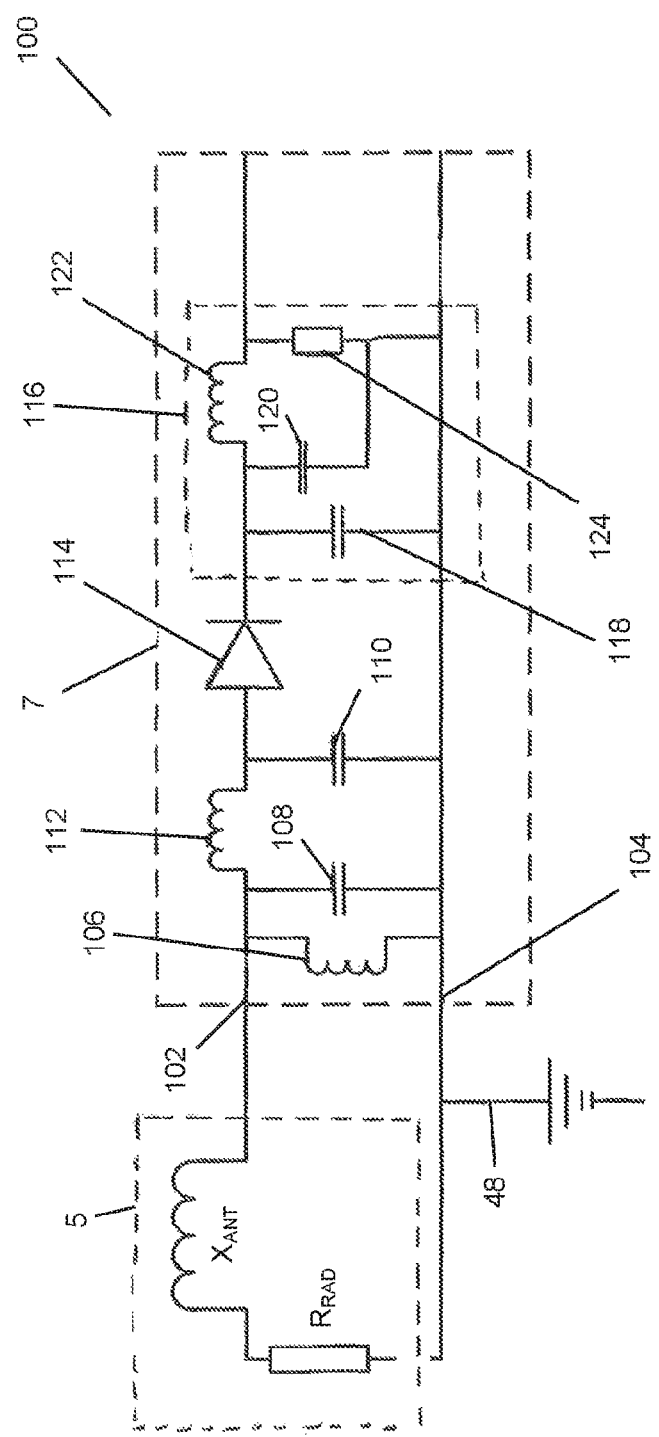
FIG. 5 shows a schematic circuit diagram useful in understanding operation of the RF power harvesting apparatus of FIG. 1.

FIG. 5 shows a circuit 100 of electrical components which correspond to the circuit provided by the apparatus of FIG. 1.

This circuit 100 comprises the monopole antenna 5 provided by the first track 6, and the rectifier 7. The antenna 5 provides an antenna reactance, $X_{ANT}$, (which may comprise some inductance and/or capacitance, for example a parallel network of inductance and capacitance). The antenna has a radiation resistance $R_{RAD}$. The radiation resistance and the antenna inductance are, in effect, connected in series between the input 102 of the rectifier 7 and the ground plane 7 of the apparatus 1.

The rectifier 7 illustrated in FIG. 1, or FIG. 3 may be provided by a rectifier 7 such as that illustrated in FIG. 5. This rectifier 7 is single ended in the sense that it comprises a single input 102 for obtaining RF input signals from the antenna 5. A second input 104 of the rectifier 7 may, in effect, be provided by a ground plane of the rectifier 48.

The rectifier 7 comprises a shunt inductor 106, a first shunt capacitor 108, a second shunt capacitor 110, a series inductor 112, and a rectifying element 114. The rectifier also comprises a low pass filter 116 having a third shunt capacitor 118, a filter inductor 122, and a filter capacitor 120. A load 124 to be charged by the rectifier is indicated as a resistor. For providing DC output, it also comprises a high DC output connection (V+) and a low DC output connection (V−).

The shunt inductor 106 and the first shunt capacitor 108 are connected in parallel between the input 102 and the ground plane 48 of the rectifier. A first plate of the first shunt capacitor 108 is connected to the input 102 and, by the series inductor 112, to a first plate of the second shunt capacitor 110. The second plate of the second shunt capacitor 110 is connected to the ground plane 48 of the rectifier 7. The series inductor 112 also connects the input 102 to the rectifying element 114. The rectifying element 114 is connected to provide a forward conduction path from the series inductor 112 to the low pass filter 116.

In the low pass filter 116, the third shunt capacitance is connected between the output of the rectifying element 114 and the ground plane 48. The filter inductor 122 is connected between the output of the rectifying element 114 and the high DC output connection (V+) of the rectifier 7. A first plate of the filter capacitor 120 is connected to the output of the rectifying element 114. The second plate of the filter capacitor 120 is connected to the ground plane 48. The second plate of the filter capacitor 120 is can be connected to a load, such as an energy store 124 at the high DC output connection (V+) of the rectifier 7. The filter capacitor 120 and the load 124 are thus connected together in series, across the filter inductor 122 (e.g. in parallel with the filter inductor 122).

The rectifying element 114 is arranged to generate, based on an RF voltage input, a DC signal and one or more harmonics of its RF voltage input. The rectifying element 114 is configured to output this DC signal and the one or more harmonics together with a component of its RF voltage input to the low pass filter 116.

The low pass filter 116 receives the DC signal from the rectifying element 114, and the component of its RF voltage input and the one or more harmonics. The impedance transitions provided by the low pass filter 116 are chosen so as to reflect the one or more harmonics back towards the rectifier.

On the AC-side of the rectifying element 114, the first shunt capacitor 108, the second shunt capacitor 110, and the series inductor 112 are arranged to couple an RF voltage from the input 102 to the rectifying element 114. This signal coupling also provides a series of impedance transitions which reflect, back towards the rectifying element 114, radio frequency signals (e.g. the reflected harmonics) which have themselves already been reflected, either by the rectifying element 114 or by the low pass filter 116.

In operation therefore an RF electrical signal is provided by the antenna 5 to the input 102 of the rectifier 7. Based on this RF signal, the rectifying element 114 provides a signal to the low pass filter 116 which includes a DC signal, a component of the RF electrical signal, and one or more harmonics of that signal. The component of the RF electrical signal, and the one or more harmonics are then reflected back towards the rectifying element 114 by the low pass filter 116. The rectifying element 114 may also reflect, back towards the input 102 of the rectifier, a portion of the RF electrical signal. These reflected signals, and those reflected back from the low pass filter 116 on the DC side of the rectifying element 114, are then in turn reflected, back towards the rectifying element 114 by the first and second shunt capacitances and the series inductor 112.

The shunt capacitors, the shunt inductor 106, the series inductor 112, and the components of the low pass filter 116 may all be provided (e.g. solely) by lumped components. That is to say they are provided by discrete components rather than by the inherent properties of transmission line structures.

An equivalent circuit for the antenna 5 of FIG. 1 is shown in FIG. 5. It will be appreciated that a similar circuit diagram may be drawn for the antenna 5', but that rather than a single inductance, or a single set of inductances in series, the antenna 5' has a number of parasitic capacitances, distributed along its length, and a number of different inductances. Such a circuit could be used with the same rectifier 7. The rectifying element may be provided by a one-way conduction path, e.g. a diode such as a Schottky diode.

Figure 6:
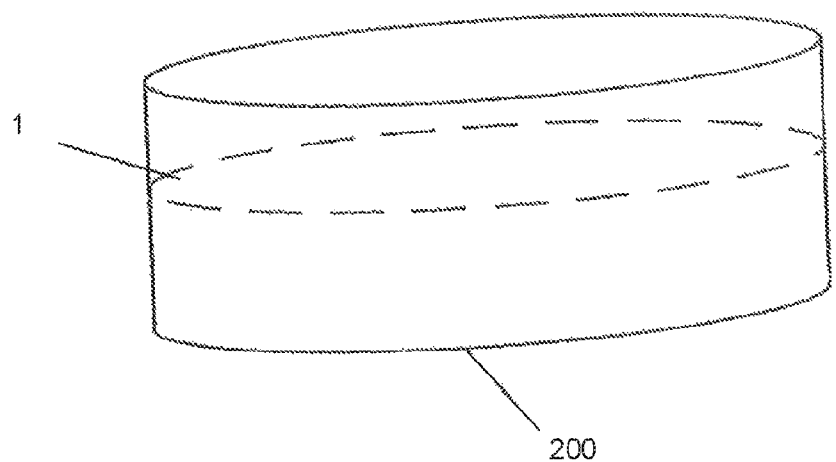
FIG. 6 shows a conductive cavity comprising an RF power harvesting apparatus.

FIG. 6 illustrates an elevation view of a cavity provided by a cylinder of conductive material. This cylinder may provide a ground plane for an RF power harvesting apparatus, or a resonant cavity for that apparatus.

The position of the substrate of such an RF power harvesting apparatus is indicated in FIG. 6 by broken lines. The cavity may have electrically conductive walls, which may have the internal form of a cylinder. The internal cross section of the cavity may match the shape of the antenna loop. The substrate may be arranged perpendicular to the walls of the cavity.

The substrates described herein are described as being circular, but they may also be other disc shapes such as oval or polygonal discs. They may have an irregular or asymmetric shape, chosen to fit them into a cavity such as that described with reference to FIG. 5. In some embodiments they need not be disc shaped.

The conductive material which makes up the tracks described herein may comprise or consist essentially of a metal such as copper, gold, or other highly and/or lightly conductive material as aluminium or stainless-steel composite material conductive material.

The tracks which provide the antennas described herein each have a selected width (e.g. lateral extent across the substrate). The width may be between 1 mm and 2 mm, for example about 1.5 mm. The tracks also have a selected thickness (extent normal to the plane of the substrate 9), which may be constant across their width—e.g. the tracks may be rectangular in cross section. Depending on their thickness, and perhaps the depth to which they might extend into the substrate the tracks may at least partially stand proud from the surface of the substrate. The tracks may be deposited on to the substrate, for example by a subtractive technique, e.g. by providing a layer of the conductive material on to the substrate and then selectively etching it away to create the tracks. Alternatively the tracks could be laid down by an additive technique, for example by deposition of the conductive material in a pattern that provides the conductive tracks. However they are provided onto the substrate, typically the tracks conform to the surface of the substrate and are mechanically supported by it.

The thickness of either or both of the tracks may be even so the top surface of the tracks is flat, or at least follows the shape of the underlying substrate. It will be appreciated in the context of the present disclosure that by varying the width and/or thickness of the tracks their impedance can be adjusted. Such variations may be applied to the antennas as a whole, and/or to some selected parts of them.

The substrate may comprise an electrical insulator such as a dielectric laminate material, which may comprise a thermoset plastic. The substrate of the embodiments illustrated in FIG. 1, FIG. 2 and FIG. 3, may comprise FR4 board having a thickness of 0.5 mm, loss tangent 0.01 and permittivity of around 4.3. Other substrates may be used such substrates may have a loss tangent of between 0.02 and 0.05 at the frequency bands of the antenna. These frequency bands may comprise the 2.4 GHz WiFi band (spanning 2.4 GHz to 2.495 GHz) and the 900 MHz GSM band. The substrate may have a loss tangent of between 0.003 and 0.004 at these frequencies, for example 0.0035. The substrate may have a relative permittivity of between 2.17 to 10.2, for example between 3 and 6, for example about 5, for example 4.8. The substrate may be rigid. For example it may have a Young's modulus of at least 1 GPa, for example at least 5 GPa, for example at least 10 GPa, for example less than 40 GPa, for example less than 25 GPa. The substrate may have a young's modulus of between 10 GPa and 30 GPa, for example between 20 GPa and 25 GPa. One example of such a material is FR-4 glass epoxy.

It will, of course, be appreciated that this example of a material is given by way of example only, and that other substrate materials (e.g. RO4003® produced by Rogers Corp™ which has a relative permittivity of 3.55 and a loss tangent of 0.0027 at these frequencies, or a RO3000® series high-frequency laminate) may be used.

The substrate may be at least 100 μm thick, for example between 100 μm and 3 mm, for example between 0.125 mm and 1.52 mm. In an embodiment the substrate is rigid and is 0.75 mm thick.

The antenna may be manufactured by subtractive or additive processes as described above. It may also be manufactured by assembling pre-manufactured components together such as by adhering a conductive sheetlike element to the substrate. This may be done by laying down a preformed track of the conductive material, or by laying down a larger sheet and then etching it away. This sheetlike element may be grown or deposited as a layer on the substrate. If it is deposited a mask may be used so the deposition happens only on regions which are to carry the conductive track and/or it may be allowed to take place over a larger area and then selectively etched away. Other methods of manufacture may also be used. For example, the antenna may be manufactured by way of '3D printing' whereby a three-dimensional model of the antenna is supplied, in machine readable form, to a '3D printer' adapted to manufacture the antenna. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the antenna may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material. In some embodiments the power harvesting antenna may be encapsulated in a flexible case, for example a polycarbonate case.

The tracks may be deposited or printed and other components, such as the rectifier mentioned above, may also be provided by the same process.

The antenna as described herein may be embodied in one such machine readable model, for example a machine readable map or instructions, for example to enable a physical representation of said antenna to be produced by 3D printing. This may be in the form of a software code mapping of the antenna and/or instructions to be supplied to a 3D printer (for example numerical code).

The above embodiments are to be understood as illustrative examples. Further embodiments are envisaged. For example, Although the line sections illustrated in FIG. 1 are of progressively increasing lengths, in some embodiments the line sections of the series may be selected differently— for example they may progressively decrease, so that the first line section is the longest, and each successive line section is shorter than the previous line section. In some embodiments at least two successive line sections in a series may be of the same length as each other. In some embodiments, the antenna tracks described herein may include at least two of: (a) two or more successive line sections of progressively decreasing length; (b) two or more successive line sections of progressively decreasing length; and (c) two or more successive line sections of the same length. Where such antenna track geometries are used, apparatus such as that illustrated in FIG. 2 and FIG. 3 may also be provided. These track geometries may be arranged so that the (line section and meander) antenna track layout on the back surface is flipped with respect to the antenna track layout on the front surface. This may enable irregular shaped antennas of any arbitrary geometry to be provided to fill irregular spaces. This can be of particular utility when there is a need to miniaturise power harvesting devices.

Where the operation of apparatus has been described, it will be appreciated that this is intended also as a disclosure of that operation as a method in its own right, which may be implemented using other apparatus. Likewise, the methods provided herein, and individual features of those methods may be implemented in suitably configured hardware. The configuration of the specific hardware described herein may be employed in methods implemented using other hardware.

With reference to the drawings, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

Any feature described in relation to any one embodiment may be used alone, or in combination with other features described, and may also be used in combination with one or more features of any other of the embodiments, or any combination of any other of the embodiments. And, those features may be generalised, removed or replaced as will be appreciated in view of the present disclosure and as set out in the claims. Furthermore, equivalents and modifications not described above may also be employed without departing from the scope of the invention, which is defined in the accompanying claims.

The invention claimed is:

1. An RF power harvester comprising:
   a dielectric substrate, having a first major surface and a second major surface, opposite to the first major surface;
   a connection for a rectifier on the first major surface;
   an antenna carried on the substrate for harvesting electrical power from a radio frequency electromagnetic field, the antenna comprising:
      a first track of conductive material, carried on the first major surface and comprising a first end adjacent an edge of the substrate, a second end for connection to the rectifier, a first series of line sections between the first end and the second end and a first plurality of meanders,
      wherein a first line section of the series provides the first end and each subsequent line section is connected to its preceding line section by a meander and is of greater length than its preceding line section;
   wherein the rectifier is disposed on the first major surface and the RF power harvester comprises a layer of conductive material disposed on the second major surface of the substrate, wherein the layer provides a ground plane for the rectifier; and
   wherein the rectifier overlies the layer, and is separated from the layer by the substrate.

2. The RF power harvester of claim 1 in which the antenna further comprises a second track of conductive material carried on the second major surface and comprising a second series of line sections and a second plurality of meanders,
   wherein a first line section of the second series provides a first end of the second track and each subsequent line section of the second series is connected to its preceding line section by a meander and is of greater length than its preceding line section.

3. The RF power harvester of claim 2 wherein each line section of the first series of line sections overlies a corresponding line section of the second series of line sections.

4. The RF power harvester of claim 1 wherein each line section comprises a straight length of conductive track.

5. The RF power harvester of claim 1 wherein a meander changes the direction of the conductive track by 180°.

6. The RF power harvester of claim 2 wherein the line sections of each series are parallel to one another, and the first meander of the first series and the first meander of the second series are spaced apart in the direction of the line sections, and in a direction through the substrate.

7. The RF power harvester of claim 6 wherein the first track follows the same path across the first major surface as the second track follows across the second major surface so that, because said surfaces are back-to-back, the second track is a flipped version of the first track.

8. The RF power harvester of claim 1 wherein the second end of the second track is connected to the layer.

9. An apparatus comprising the RF power harvester of claim 1 encircled by conductive walls which surround the dielectric substrate.

10. The apparatus of claim 9, wherein the conductive walls are provided by a cavity in a body of conductive material.

11. The apparatus of claim 1 wherein the rectifier comprises:
   a rectifying element for generating a DC signal based on an RF voltage signal obtained from the antenna,
   shunt inductor configured to allow DC current to flow between an input of the rectifying element and a ground plane of the apparatus.

12. An RF power harvester comprising:
   a dielectric substrate, having a first major surface and a second major surface, opposite to the first major surface;
   a connection for a rectifier on the first major surface;
   an antenna carried on the substrate for harvesting electrical power from a radio frequency electromagnetic field, the antenna comprising:
      a first track of conductive material, carried on the first major surface and comprising a first end adjacent an edge of the substrate, a second end for connection to the rectifier, a first series of line sections between the first end and the second end and a first plurality of meanders,
      wherein a first line section of the series provides the first end and each subsequent line section is connected to its preceding line section by a meander and is of greater length than its preceding line section;
   wherein the rectifier is disposed on the first major surface and the RF power harvester comprises a layer of conductive material disposed on the second major surface of the substrate, wherein the layer provides a ground plane for the rectifier; and
   wherein the layer is bounded by a straight edge which is aligned with the line sections.

13. An RF power harvester comprising:
   a dielectric substrate, having a first major surface and a second major surface, opposite to the first major surface;
   a connection for a rectifier on the first major surface;
   an antenna carried on the substrate for harvesting electrical power from a radio frequency electromagnetic field, the antenna comprising:
      a first track of conductive material, carried on the first major surface and comprising a first end adjacent an edge of the substrate, a second end for connection to the rectifier, a first series of line sections between the first end and the second end and a first plurality of meanders,
      wherein a first line section of the series provides the first end and each subsequent line section is connected to its preceding line section by a meander and is of greater length than its preceding line section;
   wherein the rectifier comprises:
      a rectifying element for generating a DC signal based on an RF voltage signal obtained from the antenna, and
      a shunt inductor configured to allow DC current to flow between an input of the rectifying element and a ground plane of the apparatus;

wherein the rectifying element is arranged to generate, based on the RF voltage signal, a DC signal and one or more harmonics of the RF voltage signal, and to output the DC signal and the one or more harmonics together with a component of the RF voltage signal; and the apparatus comprises:

a first signal coupling arranged to provide the RF voltage signal to the rectifying element; and a low pass filter arranged to receive, from the rectifying element, the DC signal, the component of its RF voltage input, and the one or more harmonics, and to reflect the one or more harmonics back towards the rectifying element;

wherein the first signal coupling is further arranged to reflect back towards the rectifying element radio frequency signals from the rectifying element that are based on the reflected signals.

* * * * *